(12) United States Patent
Hoshino et al.

(10) Patent No.: US 10,392,529 B2
(45) Date of Patent: Aug. 27, 2019

(54) FILM HAVING METALLIC LUSTER, ARTICLE HAVING SAID FILM FORMED THEREON, AND MANUFACTURING METHOD FOR FILM HAVING METALLIC LUSTER

(71) Applicant: National University Corporation Chiba University, Chiba-shi, Chiba (JP)

(72) Inventors: Katsuyoshi Hoshino, Chiba (JP); Reo Tagawa, Chiba (JP)

(73) Assignee: NATIONAL UNIVERSITY CORPORATION CHIBA UNIVERSITY, Chiba-shi, Chiba (JP)

( * ) Notice: Subject to any disclaimer, the term of this patent is extended or adjusted under 35 U.S.C. 154(b) by 0 days.

(21) Appl. No.: 14/418,799

(22) PCT Filed: Jul. 31, 2013

(86) PCT No.: PCT/JP2013/070816
§ 371 (c)(1),
(2) Date: Nov. 10, 2015

(87) PCT Pub. No.: WO2014/021405
PCT Pub. Date: Feb. 6, 2014

(65) Prior Publication Data
US 2016/0075917 A1 Mar. 17, 2016

(30) Foreign Application Priority Data
Jul. 31, 2012 (JP) ................................. 2012-170468

(51) Int. Cl.
*B05D 5/06* (2006.01)
*B05D 7/04* (2006.01)
(Continued)

(52) U.S. Cl.
CPC ............ *C09D 181/02* (2013.01); *B05D 5/067* (2013.01); *B05D 7/04* (2013.01); *C03C 17/009* (2013.01);
(Continued)

(58) Field of Classification Search
CPC ................. C03C 17/44; C08G 61/126; C08G 2261/3223; C08G 2261/43; C08G 2261/792
See application file for complete search history.

(56) References Cited

U.S. PATENT DOCUMENTS 5,098,529 A * 3/1992 Feldhues ................ H01B 1/127
205/419

OTHER PUBLICATIONS

English translation of "Ambipolar Transport in Bilayer Organic Field-Effect Transistor", Kyushu Institute of Technology, Mar. 1, 2010 27-28 (7 pages).
(Continued)

*Primary Examiner* — Shane Fang
(74) *Attorney, Agent, or Firm* — Flynn Thiel, P.C.

(57) ABSTRACT

A film having a metallic luster is easier to manufacture and exhibits little degradation over time, an article having the film formed thereon, and a manufacturing method for the film having a metallic luster. The film, which has a metallic luster, according to one aspect of the present invention, is characterized by containing a thiophene polymer. The manufacturing method for the film which has a metallic luster, according to another aspect of the present invention, is characterized by a thiophene being polymerized using an oxidizing agent and made into a solution containing the thiophene polymer, and then coating and drying the solution containing the thiophene polymer on an article. The article having the film which has a metallic luster formed thereon, according to another aspect of the present invention, is characterized by containing a thiophene polymer.

3 Claims, 13 Drawing Sheets

(51) Int. Cl.
  *C08K 3/16*  (2006.01)
  *C08K 3/24*  (2006.01)
  *C03C 17/00*  (2006.01)
  *C03C 17/32*  (2006.01)
  *C03C 17/44*  (2006.01)
  *C08G 61/12*  (2006.01)
  *C09D 181/02*  (2006.01)

(52) U.S. Cl.
  CPC .............. *C03C 17/32* (2013.01); *C03C 17/44* (2013.01); *C08G 61/126* (2013.01); *B05D 2203/35* (2013.01); *C03C 2217/72* (2013.01); *C08G 2261/1412* (2013.01); *C08G 2261/1424* (2013.01); *C08G 2261/3223* (2013.01); *C08G 2261/43* (2013.01); *C08G 2261/792* (2013.01); *C08K 3/16* (2013.01); *C08K 3/24* (2013.01)

(56) References Cited

OTHER PUBLICATIONS

English translation of "Conductivity and cyclic voltammetry investigations of electrochemically synthesized polythiophene", Journal of Polymer Materials, 9(2), 1992, 147-151 (5 pages).
English translation of article by Katsuyuki Ogura, et al., "Facile Formation of Stable Crystals with Gold-like Metallic Luster from Organic Molecules: 1-Aryl-2-(2-thienyl)-5-[5-tricyanoethenyl)-2-thienyl]pyrroles", Bull. Chem. Soc. Jpn., 75, 2359-2370 (2002) (12 pages).
English translation of article by Akiko Matsumoto, et al., "Gold-Colored Organic Crystals Formed from an Azobenzene Derivative", Journal of Oleo Science, 59, (3) 151-156 (2010) (6 pages).

* cited by examiner

FILM HAVING METALLIC LUSTER, ARTICLE HAVING SAID FILM FORMED THEREON, AND MANUFACTURING METHOD FOR FILM HAVING METALLIC LUSTER

TECHNICAL FIELD

The present invention relates to a film which has metallic luster, an article which has a film having metallic luster formed thereon, and a method for producing the film which has metallic luster.

BACKGROUND OF THE INVENTION

As a metal is generally hard, it is used for parts which need a high mechanical strength such as a home electric appliance and a car. Further, since a metal has a metallic luster and good texture, it is also used for every possible article in our daily life. Especially, gold is very popular because it provides a feeling of high quality.

However, a metal is expensive and metal machining is not easy. Therefore, the article which is made of a metal is expensive.

As a means for solving the above-mentioned problems, there are some arts such as a metal plating method and a surface coating method. The metal plating method comprises a step of coating a surface of an article which is made of such as a polymer or a glass, with a thin metal film. The surface coating method comprises a step of coating a surface of an article with a coating material which contains such as small particles and a flaky metal.

In these arts, since an article is made of polymer chemical compound and the surface is covered with a thin metal film or coating material which contains a metal, it is possible to manufacture an article having a metallic luster cheaply.

However, with regard to the above-mentioned metal plating, the material which can be used for surface processing is greatly restricted.

Further, the above-mentioned method has to use a metal. Though the cost of an article which is made by the above-mentioned method is cheaper than an article which is all made of metal, it is ultimately expensive.

Especially, in the above-mentioned coating material which comprises a metal, metal particles will be precipitated by the difference of the specific gravity between a polymer binder and the metal. Accordingly, the coating film has a problem that it may become uneven.

Accordingly, it is thought that if material which has metallic luster exists, the above-mentioned problem will be solved.

And, as prior arts with regard to non-metal material, there are articles which are described in the undermentioned NON-PATENT DOCUMENT 1 and 2.

RELATED ART DOCUMENT

Non-Patent Document

NON-PATENT DOCUMENT 1 K. Ogura et al., Bulletin of the chemical Society of Japan, Vol. 75, 2359-2370 (2002)
NON-PATENT DOCUMENT 2 A. Matsumoto et al., Journal of Oleo Science, Vol. 59, 151-156 (2010)

DESCRIPTION OF THE INVENTION

Problems to be Solved by the Invention

However, in the art described in the above-mentioned NON-PATENT DOCUMENT 1, the film forming cannot be carried out without vacuum evaporation method. Accordingly, the film forming is very difficult, and articles which are obtained by the method is very expensive.

By the art which is described in the above-mentioned NON-PATENT DOCUMENT 2, it is possible to use for coating material and form a film.

However, the time degradation of the film is large. The film loses its metallic luster, though the film is left for just one day.

Accordingly, in consideration of the above-mentioned problem, the purpose of the present invention is to provide a film having a metallic luster which can be easily produced and has less deterioration with time. Further, the purpose of the present invention is also to provide an article having the film formed thereon and a method for producing the film.

Solution to the Problems

One aspect of the present invention which solves the above-mentioned problem is a film having a metallic luster, which comprises thiophene polymer whose distribution peak of the weight-average molecular weight is from 200 to 30000.

Moreover, another aspect of the present invention is an article which has a film having a metallic luster, which comprises a thiophene polymer whose distribution peak of the weight-average molecular weight is from 200 to 30000.

Moreover, another aspect of the present invention is a method for producing a film having metallic luster, which comprises a step of preparing a solution comprising a thiophene polymer which is polymerized by using an oxidant, so that the distribution peak of the weight-average molecular weight is from 200 to 30000, and a step of coating an article with the solution which comprises the thiophene polymer, and drying the thiophene polymer.

Effects of the Invention

From the above, it is possible to provide a film having a metallic luster which can be easily produced and has less deterioration with time. Further, it is also possible to provide an article the film formed thereon and a method for producing the film.

BEST MODE FOR CARRYING OUT THE INVENTION

Hereinafter, embodiments of the present invention is described with reference to the drawings. However, the present invention can be accomplished with different embodiments and is not limited to embodiments and examples described below.

Figure 1:
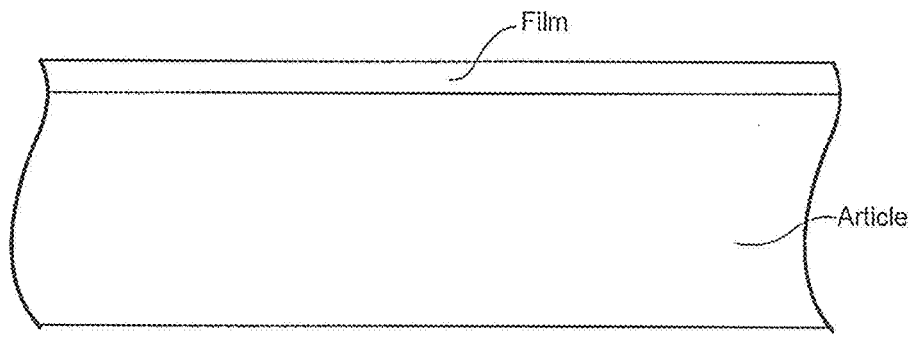
FIG. 1 shows a schematic of a cross-section of an article of the embodiment, which has a film which has a metallic luster and comprises a thiophene polymer.

FIG. 1 is a schematic of a cross-section of an article of this embodiment. The article is covered with a film which has a metallic luster and comprises a thiophene polymer.

The article is applicable for every possible goods in daily life, such as not only a home electric appliance, a car, an electronic product, and parts of them, but also furniture, toys, general goods, clothes, paper products, and wrapping.

Further, it is desirable that the material for the article is a polymeric compound and a glass. They can facilitate film forming and reduce cost.

In this embodiment, the thickness of the film having a metallic luster is not limited, as far as the film has a metallic luster.

When the thickness is 0.1 micrometers or more, the film can show a metallic luster. On the other hand, when the thickness is 1 micrometer or more, the film can sufficiently show a metallic luster.

Moreover, in this embodiment, the film having a metallic luster comprises a thiophene polymer whose distribution peak of the weight-average molecular weight is from 200 to 30000.

In this embodiment, "thiophene polymer" means that at least two thiophene are bound each other and are polymerized. Further, the general formula of thiophene polymer is shown in the undermentioned chemical formula. Incidentally, in this embodiment, the thiophene is an oligomer.

Compound 1

In the above-mentioned formula, R is a substituent. It is desirable that the substituent is an alkoxy group, an amino group, an alkyl group, a hydroxyl group, a hydroxyalkyl group, an aryl group, a cyano group, or halogen. Further, for obtaining a metallic luster certainly, it is more desirable that the substituent is an alkyl group, an alkoxy group, or a halogen. It is possible that the number of R is 1 or 2 in a thiophene ring. Further, R of each thiophene can be the same or different. However, it is not limited to that, as long as the film can have a metallic luster.

Incidentally, as mentioned above, "thiophene" is a heterocyclic compound which includes sulfur and the general formula of it is shown in the undermentioned chemical formula.

The definition of R is as same as the above-mentioned R.

Compound 2

When R of the above-mentioned chemical formula is an alkoxy group, it is desirable that the number of carbon atoms is 1 or 2.

Further, it is more desirable that R is 3-methoxy thiophene, 3,4-dimethoxy thiophene, 3-ethoxy thiophene, 3,4-diethoxy thiophene, 3,4-ethylene dioxy thiophene.

If the number of carbon atoms is 1 or 2, the layer-like orientational structure will be effectively appeared.

Moreover, when R of the above-mentioned formula is an alkyl group, it is desirable that the number of carbon atoms is 1 or 2. Further, it is more desirable that R is 3-methyl thiophene, 3,4-dimethyl thiophene, 3-ethyl thiophene, 3,4-diethyl thiophene.

If the number of carbon atoms is 1 or 2, the layer-like orientational structure will effectively appear.

When R of the above-mentioned formula is an amino group, it is desirable that R is such as 3-aminothiophene, 3,4-diaminothiophene, 3-methylaminothiophene, or 3-dimethylaminothiophene.

Moreover, in this case, if carbon is included, it is desirable that the number of carbon atoms is 1 or 2.

In this embodiment, the molecular weight of the "thiophene polymer" is not limited, as far as the film can be formed, and have a metallic luster. But it is desirable that the thiophene polymer is an oligomer. Specifically, it is desirable that the distribution peak of the weight-average molecular weight obtained by GPC measurement method is from 200 to 30000, it is more desirable that it is from 500 to 20000 or less, and it is especially desirable of no more than 10000.

When the molecular weight is adjusted in the above-mentioned range, the film is able to have layer-like orientational structure.

Moreover, in this embodiment, it is desirable that the thiophene polymer is polymerized by using chemical polymerization. It is not limited to that, as far as the film can have a metallic luster.

Here, "chemical polymerization" means a polymerization method which is carried out in a liquid phase or solid phase using an oxidant.

In this embodiment, the reason for the metallic luster of a thiophene polymer, which is obtained by a chemical polymerization method, has not been proven yet.

However, it is thought that the reason for the metallic luster comes from a regular arrangement of molecules which consists of a thiophene polymer. By this arrangement, light of a specific wavelength will be refrected.

This estimation is supported by a sharp peak of X-ray diffraction for the film of this embodiment.

Further, in the X-ray diffraction measurement, there is no halo pattern, and three peaks which are derived from the regular structure of the thiophene polymer exist in the range from 5 to 30 degrees. The detail will be described subsequently.

The article of this embodiment is covered with the above-mentioned film which includes a thiophene polymer. Since, the thiophene polymer is extremely stable in air, it has less deterioration with time, even if it is left in air for a long time, and it can still show a metallic luster for a long time.

Here, a method for producing a film having a metallic luster (hereinafter refer to "the method") will be explained.

The method comprises (1) a step of preparing a solution which includes a thiophene polymer which is polymerized from thiophene using an oxidant, and (2) a step of coating an article with the solution which includes the thiophene polymer and drying it. Namely, in this embodiment, a thiophene polymer is produced by chemical polymerization.

As mentioned above, the method has (1) a step of preparing a solution which includes a thiophene polymer which is polymerized from thiophene using an oxidant.

Here, the meanings of "thiophene" and "thiophene polymer" are mentioned above.

As mentioned above, it is desirable that the thiophene polymer is an oligomer. Specifically, it is desirable that the peak of the weight-average molecular weight is from 200 to 30000.

In this step, it is desirable that the oxidant is such as a ferric salt, cupric salt, ceric salt, dichromate, permanganate, ammonium persulphate, boron trifluoride, bromate, hydrogen peroxide, chlorine, bromine, or iodine (I). Further, among the above-mentioned group of oxidants, a ferric salt is the more desirable. Incidentally, the oxidant can be a hydrate of the above-mentioned compounds.

Moreover, in this case, the counter ion is also adjustable.

For example, a chloride ion, citrate ion, oxalate ion, p-toluensulfonic acid ion, perchlorate ion, hexafluorophosphoric acid ion, and tetrafluoroborate ion, are preferable. Further, in the above-mentioned examples, a perchlorate ion, hexafluorophosphoric acid ion, and tetrafluoroborate ion are more preferable. If at least one of the above three oxidants was used, a golden metallic luster will be obtained.

The reason for the appearance of a golden metallic luster is not clear but it is thought that a perchlorate ion, hexafluorophosphoric acid ion or tetrafluoroborate ion will be doped in the thiophene polymer in polymerization, the oxidant will bond to a cation site of the thiophene polymer, and a regular structure will be formed.

Actually, the regular structure is confirmed by the analysis of the film metallic luster.

In this step, it is desirable that the polymerization is carried out in a solvent. The solvent is not limited, as far as it is possible that the oxidant and thiophene can be dissolved and polymerization can be carried out efficiently.

As a solvent, an organic solvent with a volatility and high polarity is desirable. For example, acetonitrile, nitromethane, γ-butyrolactone, propylene carbonate, 1-methyl-2-pyrrolidinone, dimethyl sulfoxide, 2-butanone, tetrahydrofuran, acetone, methanol, anisole, chloroform, ethyl acetate, hexane, trichloroethylene, cyclohexanone, dichloromethane, dimethylformamide, ethanol, butanol, pyridine, dioxane, and mixtures of the above are preferable. Further, in the above-mentioned examples, acetone, nitromethane, γ-butyrolactone, and propylene carbonate are more preferable. They can efficiently dissolve a thiophene polymer and easily form the film which has a metallic luster.

In this step, the weight of thiophene and oxidant for the solvent are adjustable, and they are not limited.

For example, if the weight of the solvent is defined as 1, it is preferable that the weight of the thiophene is 0.00007 or more and 7 or less, and it is more preferable that the weight of the thiophen is 0.0007 or more and 0.7 or less.

If iron (III) perchlorate n-hydrate is used, it is preferable that the weight of it is 0.0006 or more and 6 or less, and it is more preferable that it is 0.006 or more and 0.6 or less.

Moreover, in this step, it is desirable that the ratio of oxidant against thiophene is 0.1 or more and 1000 or less, when the weight of thiophene is defined as 1.

Moreover, it is possible that the thiophene and oxidant are added in a solvent at one time. But it is also possible that a solvent which comprises the thiophene and a solvent which comprises the oxidant were separately made, and after that, they are mixed each other.

The solution obtained by this step is able to be preserved as it is.

But, a step of removing the solvent of the solution, a step of obtaining thiophene polymer powder by drying after washing, and a step of preparing a solution which comprises the thiophene polymer by adding the solvent again are preferable.

In this case, the examples of the solvents are the same as the solvents which are described above. It is possible that the solvent can be the same as the solvent which is used in polymerization, and be different from the solvent which is used in polymerization.

By these steps, it is possible to remove monomers and oxidants which were added excessively in the polymerization reaction.

However, if the oxidant comprises at least one of a perchlorate ion, hexafluorophosphate ion, and tetrafluoroboric acid ion, the oxidant can remain in the above-mentioned polymer and maintain the metallic luster stably.

Moreover, the method comprises (2) a step of coating an article with the solution which includes the thiophene polymer and drying it. The examples of the article to be coated, are mentioned above.

In this step, the examples of the method for coating the solution comprising a thiophene polymer on the article, are such as a spin coating, a bar coating, a dip coating, and a drop casting. But the method is not limited to those, as long as the coating can be carried out.

For forming so that the film has a metallic luster, drop casting and dip coating are desirable.

In this method, a more excellent metallic luster may appear by rubbing the film after drying in the above-mentioned step. Of course, it is thought that different results may be obtained with different solvents.

By rubbing the film, it is possible to arrange the polymer more regularly and obtain a better metallic luster.

For example, if nitromethane is used for the solvent, it is possible to show a metallic luster without rubbing the film but if acetonitrile is used for the solvent, rubbing the film is desirable.

Incidentally, it is desirable that the means for rubbing the film is a cloth or paper but is not limited to that.

From the above, it is possible to provide a film having a metallic luster which can be easily produced and has less deterioration with time. Further, it is also possible to provide an article with the film formed thereon and a method for producing the film.

Incidentally, the film having a metallic luster of the present invention has an electrical conductivity.

As a result, it is also possible to keep the conductivity by forming a film of this embodiment on a surface of an insulating article.

EXAMPLES

Here, the film of the above-mentioned embodiment was actually formed, and the effect of the film was confirmed. The process and the result will be specifically explained below.

Example 1

(1) Synthesis of 3-methoxy Thiophene Polymer

First, 20 milliliters of an acetonitrile solution (the concentration is 0.2 M), which includes Iron(III) perchlorate n-hydrate, was prepared and magnetically stirred.

Next, 20 ml of an acetonitrile solution which comprised 3-methoxy thiophene was prepared and taken in a polymerization cell made of glass.

After that, the acetonitrile solution was magnetically stirred at 400 rpm with bubbling for 30 min.

Figure 2:
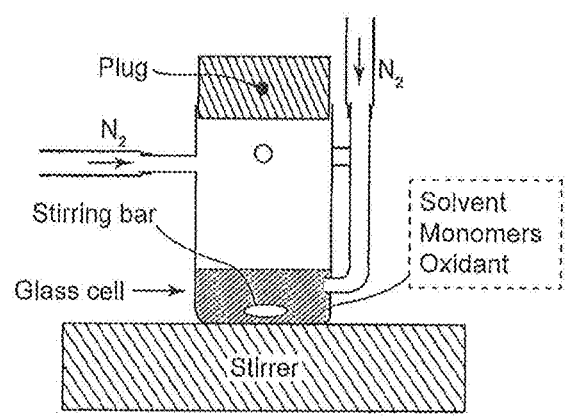
FIG. 2 shows a schematic of a polymerization apparatus which was used in the examples.
Figure 3:
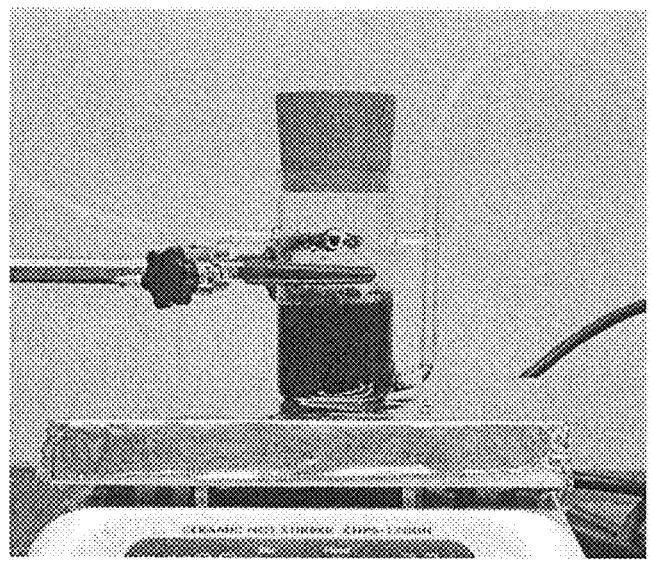
FIG. 3 shows a photograph of a polymerization apparatus which was used in the examples.

Incidentally, the schematic of a device which was used in this case is shown in FIG. 2, and the photograph of the actual device is shown in FIG. 3.

Then, the above-mentioned acetonitrile solution, which comprised iron (III) perchlorate n-hydrate, was added to the above-mentioned acetonitrile solution, which comprised 3-methoxy thiophene.

After that, the solution was mixed and left for 2 hours, and polymerization was carried out.

Next, the solution and the precipitate were sucked and filtered using a glass filter (the pore diameter was 5-10 micrometers). Then, the residue on the glass filter was sufficiently washed by methanol, and the oxidant was removed.

After that, 3-methoxy thiophene polymer powder was obtained by drying the residue at 50 degrees.

The color of the powder was black, but a golden-like metallic luster was found in the powder.

Figure 4:
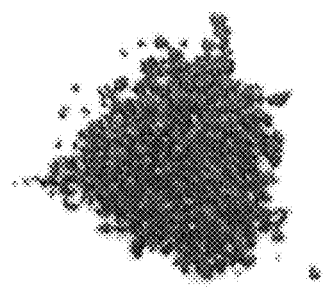
FIG. 4 shows a photograph of the powder which was obtained in example 1.
Figure 5:
FIG. 5 shows a scanning microscope image of the powder which was obtained in example 1.

The photograph of the powder is shown in FIG. 4, and the photograph of the scanning electron microscope (SEM) is in FIG. 5. The measurement of the SEM is carried out using an ABT-32 (TOPCON corporation).

When the average of the molecular weight and the distribution of molecular weight were measured by Gel Permeation Chromatography (GPC), it was confirmed that the weight-average molecular weight was $1.6 \times 10^3$, and the distribution of the molecular weight was several hundreds or more and ten thousand or less.

Figure 6:
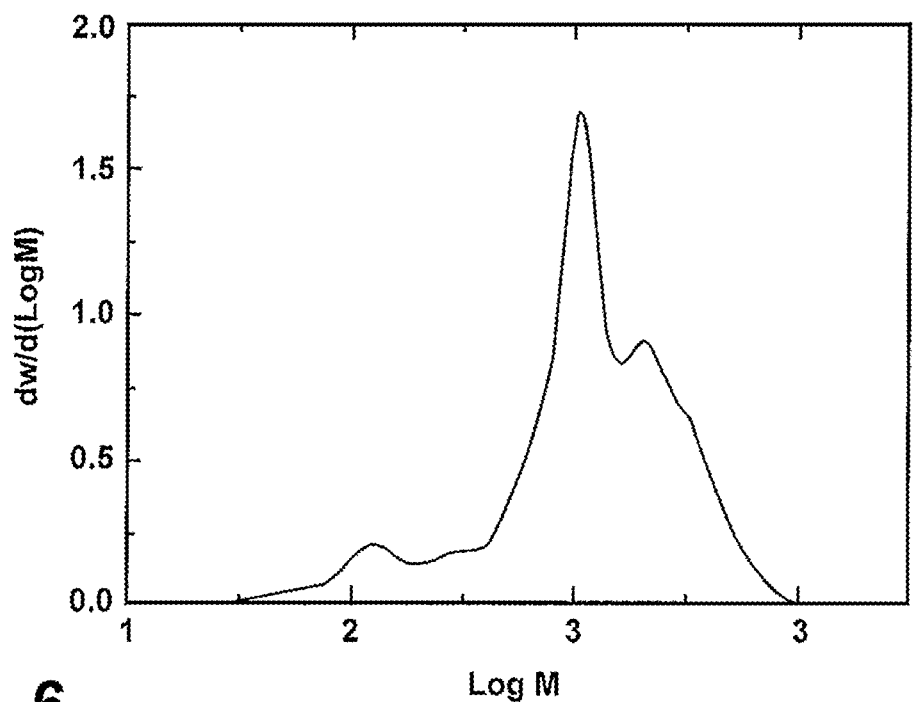
FIG. 6 shows the molecular weight distribution of the powder which was obtained in example 1.

The distribution of the molecular weight is shown in FIG. 6.

Incidentally, GPC measurement was carried out by using a Waters PDA 996 detector and Shodex KF-806M Column (elution speed: 0.4 ml/min, temperature: 60 degree).

In this measurement, N-methylpyrrolidinone which included lithium bromide (0.01M) was used as an eluent, and standard polyethylene was used as proofreading.

The data of the elemental composition was confirmed by elemental analysis. The result is shown in the below table.

Incidentally, the analysis of carbon and hydrogen was carried out by using a Perkin-Elmer 2400 (Perkin Elmer Corporation), and the analysis of sulfur and chlorine was carried out by using a YANAKO Combustion System (combustion furnace SQ-1 type and absorbing unit HSU-35 type, YANAKO Corporation) and Ion Chromatographic System ICA-2000 (DKK-TOA corporation).

As a result, the theoretical value of the elemental analysis and the measured value is a match, when 1 water molecule and 3 molecular chlorine are included in 10 methoxy thiophene units.

Table 1

TABLE 1

| element | theoretical value (weight %) | measured value (weight %) |
|---|---|---|
| carbon | 39.09 | 38.83 |
| hydrogen | 2.85 | 2.95 |
| oxygen | 30.24 | 30.39 |
| chlorine | 6.95 | 6.96 |
| sulfur | 20.87 | 20.87 |

Figure 7:
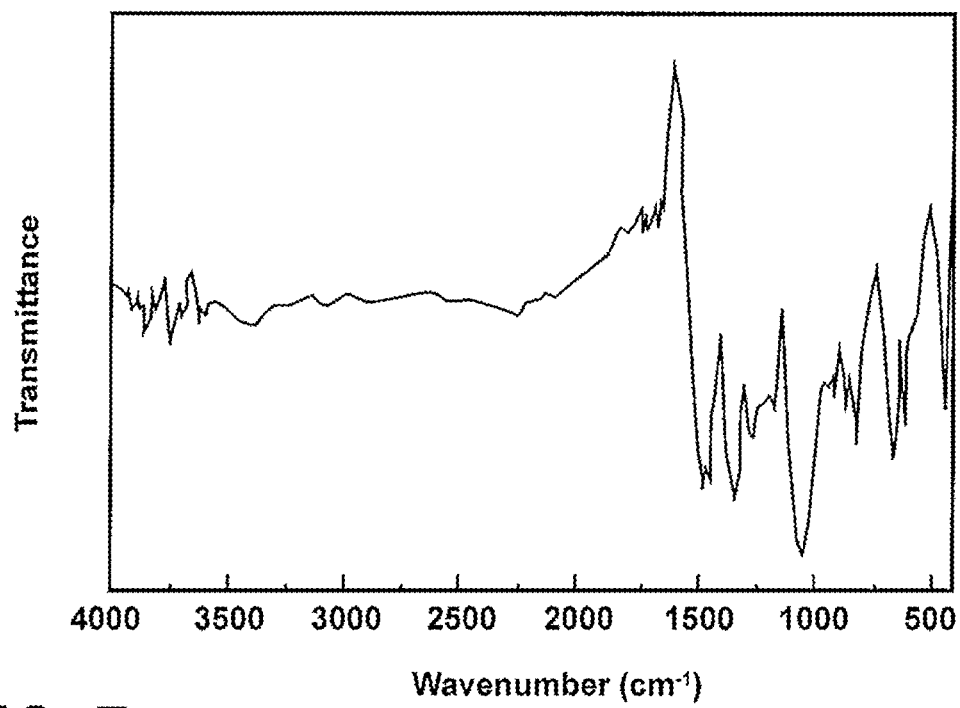
FIG. 7 shows an IR spectrum of the powder which was obtained in example 1.

Further, an IR spectrum measurement (JASCO Corporation, FT/IR 410) was carried out, and it was confirmed that the obtained material was 3-methoxy thiophene polymer which was doped with a perchlorate ion. The IR spectrum is shown in FIG. 7.

As a result, a signal based on a perchlorate ion was clearly observed at 1100 $cm^{-1}$.

By this result, it is estimated that a metallic luster appears by the thiophene polymer which was doped with a perchlorate ion.

Further, the mass of the doped perchlorate ion can be calculated by the result of the above-mentioned elemental analysis.

Namely, the doping rate 0.3 was obtained by calculating the ratio of the mass of chlorine atoms to the mass of sulfur atoms, from the result of the above-mentioned table.

As a result, it was found that three perchlorate ions were doped for every 10 units of thiophene.

Figure 8:
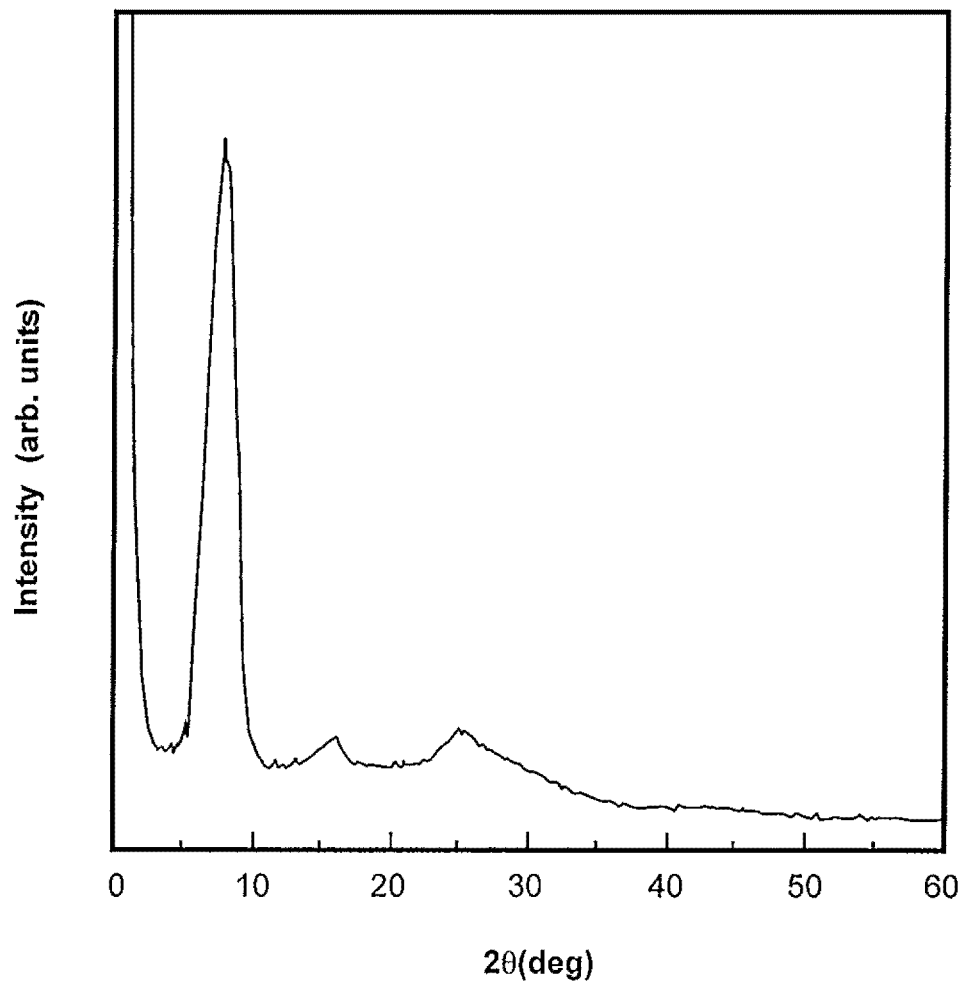
FIG. 8 shows a result of X-ray diffraction measurement of powder which was obtained in example 1.

As shown in FIG. 8, an X-ray diffraction having sharp peak was obtained by X-ray diffraction measurement for the film (film thickness: 1.5 micro meters) which covered the glass plate.

For the measurement, Smart Lab (Rigaku Corporation) was used.

By this result, it was confirmed that the coating film had an extremely regular structure.

Figure 9:
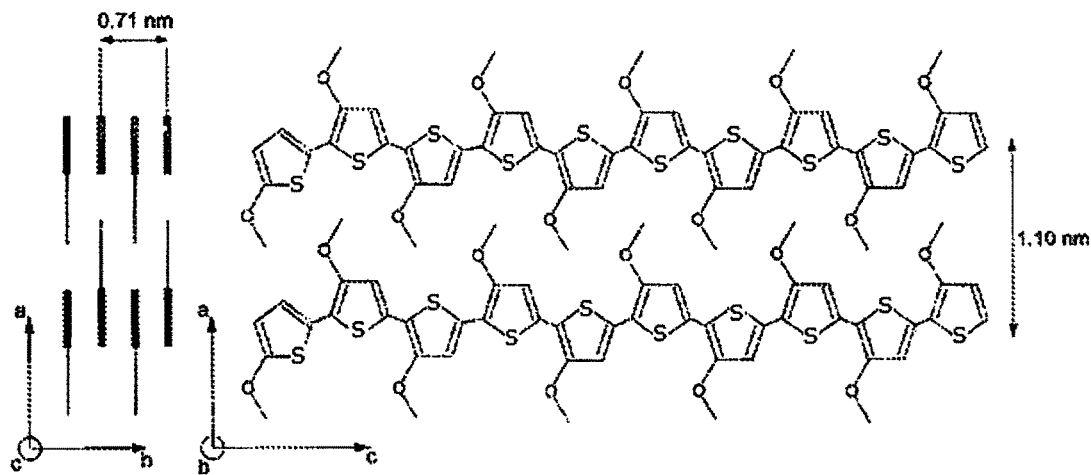
FIG. 9 shows a conceptual drawing of the powder which was obtained in example 1.

The image of the regular structure of thiophene polymer, which is assumed from the result, is shown in FIG. 9.

As shown in this figure, it is deduced that the thiophene polymer chains were regularly arranged and piled in layers. Accordingly, it is thought that the arrangement is one of the reasons of the metallic luster.

Moreover, a cyclic voltammetry measurement was performed with the 3-methoxy thiophene polymer obtained by the above-mentioned polymerization.

Figure 10:
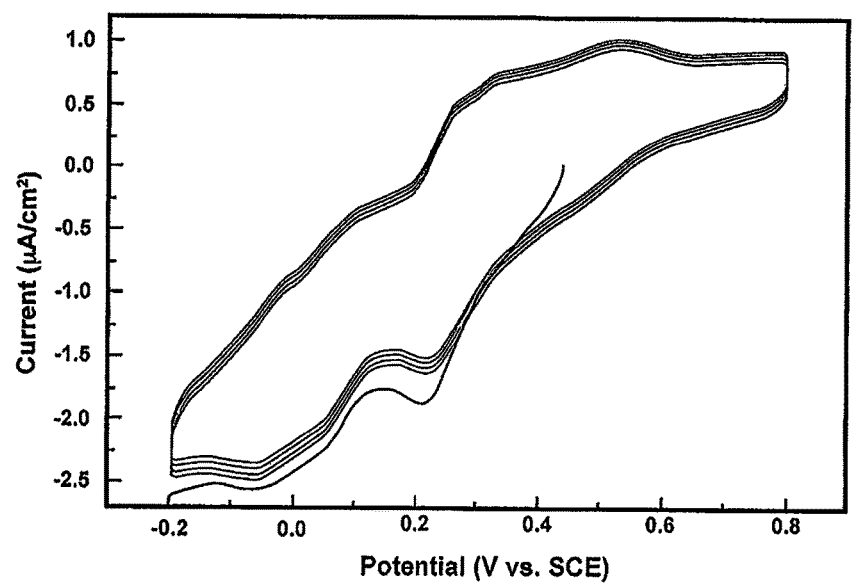
FIG. 10 shows a result of a cyclic voltammetry measurement of the powder which was obtained in example 1.

As a result, as shown in FIG. 10, it was confirmed that an oxidation-reduction reaction of four stages occurred.

It is not a definite answer, but it is thought that the metallic luster will appear when the polymerization is used.

The cyclic voltammetry measurement was carried out, by using an electrochemical analyzer (ALS 600DH).

The polymer and perchlorictetraammonium (0.1M) were dissolved in the solution which was used in the measurement.

The concentration of the polymer is 5 mM which was converted to monomer units.

The solution in which the polymer and tetrabutylammonium perchlorate (0.1M) were dissolved was used as a measurement solution. The concentration of the polymer was 5 mM, which was converted to monomer units.

An ITO electrode formed on a glass plate, a platinum electrode, and a saturated calomel electrode (SCE), were used as the working electrode, the counter electrode, and the reference electrode, respectively. The potential scan rate was 10 mV/s.

(Forming the Film which has a Metallic Luster)

The powder 11 milligrams, which was obtained by the above-mentioned procedure, was dissolved in 1 milliliter of nitromethane.

The color of the solution was dark blue.

Next, the above-mentioned solution was spread on the glass substrate by a dropper.

In this case, the coating thickness of the solution was adjusted so as not to be able to see the opposite side.

Next, the substrate which was covered with the above-mentioned solution was sufficiently air dried.

The color of the surface was changed from dark blue, which was the original color of the solution, to a golden color.

Figure 11:
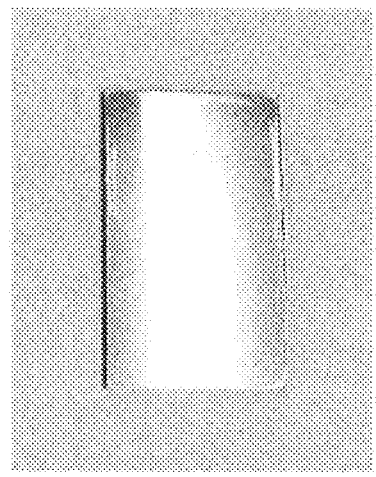
FIG. 11 shows a photograph of a film which was obtained in example 1.
Figure 12:
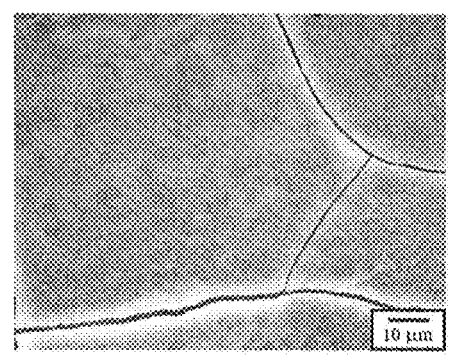
FIG. 12 shows a SEM image of a film which was obtained in example 1.
Figure 13:
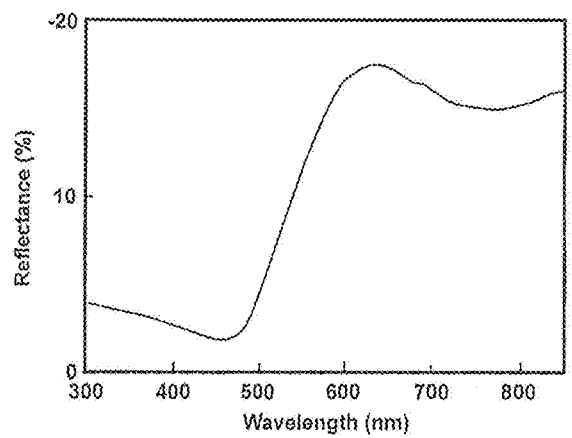
FIG. 13 shows a reflection spectrum of a film which was obtained in example 1.

The photograph of the polymer film is shown in FIG. 11, the SEM image is shown in FIG. 12, and the reflection spectrum is shown in FIG. 13, respectively.

Namely, it was confirmed that a film having a metallic luster and an article having the film could be produced by this example.

Example 2

The processes of this example are the same as the above-mentioned example 1 except that the powder 12 milligrams of 3-methoxy thiophene polymer, which was obtained by the above-mentioned example 1, was dissolved in 1 milliliter of acetonitrile.

Figure 14:
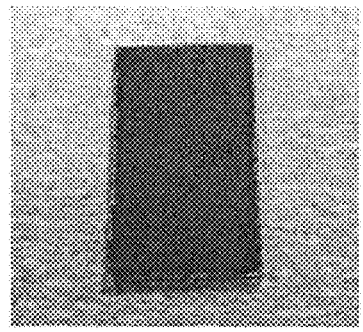
FIG. 14 shows a photograph of a film (with air drying) which was obtained in example 2.

In this example, the color of the air drying film became a weak copper. The photograph of this case is shown in FIG. 14.

Figure 15:
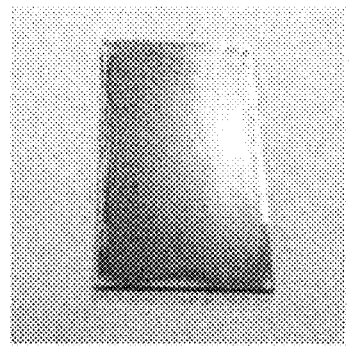
FIG. 15 shows a photograph of a film which was obtained in example 2.
Figure 16:
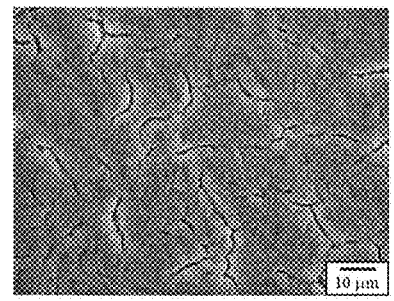
FIG. 16 shows a SEM image of a film which was obtained in example 2.

When the dried surface of the polymer film was polished by a cloth, a golden metallic luster appeared. The photograph is shown FIG. 15. Further, a SEM image of the film is shown in FIG. 16.

Namely, it was confirmed that a film having a metallic luster and an article having the film could be produced by this example.

Example 3

A solution which comprises the thiophene polymer of the above-mentioned example 1 was prepared. Further, a plurality of articles having films with metallic lusters, was produced using PET films as other substrates.

In this substrate, it was also confirmed that the film having a good metallic luster was able to be obtained.

Example 4: Electric Conductivity

The electric conductivity of the above-mentioned article having a film which has a metallic luster was measured. The result will be explained below.

An electric conductivity measurement was performed by using the four-point probe method (LORESTA-GPMCP-T600, Mitsubishi Chemical Analytech Inc.).

Especially, the limiter voltage was set at 10 V, the sheet resistances of five points of the sample surface were measured, and the average of them was obtained.

Further, nitromethane was used as the solvent for preparing the polymer solution, glass and PET were used as substrates for forming the films.

Furthermore, The measurements were carried out before rubbing the surface of the film and after rubbing it, respectively (Two films which used PET films as the substrates, were made.).

The result will be shown the below-described table 2.

Table 2

TABLE 2

| number | substrate | rubbing | filmthickness (μm) | sheet resistance (Ω/sq) | electric conductivity (S/cm) |
|---|---|---|---|---|---|
| 1 | glass | no | 1.3 | $1.0 \times 10^6$ | $7.5 \times 10^{-3}$ |
| 2 | | yes | | $1.1 \times 10^6$ | $7.2 \times 10^{-3}$ |
| 3 | PET film | no | 1.8 | $1.7 \times 10^6$ | $3.4 \times 10^{-3}$ |
| 4 | | yes | | $2.4 \times 10^6$ | $2.3 \times 10^{-3}$ |
| 5 | PET film | no | 2.0 | $7.4 \times 10^5$ | $6.8 \times 10^{-3}$ |
| 6 | | yes | | $1.0 \times 10^6$ | $4.9 \times 10^{-3}$ |

Example 5

In this example, the condition was the same as that of example 1, except that iron (III) perchlorate n-hydrate was changed to iron (III) chloride 6-hydrate, the obtained 3-methoxy thiophene polymer powder 4 mg was dissolved in 2.5 milliliters of distilled water, and the solution was used for coating.

As a result, it was confirmed that a film having a reddish copper metallic luster was formed.

However, the polymerization velocity of the thiophene polymer of this example was slower than that of the above-mentioned example 1.

The polymer which stuck to the face of the wall of the polymerization cell had already had a strong metallic luster, the yield of the polymer was lower, and the powder particles of the polymer were finer.

Figure 17:
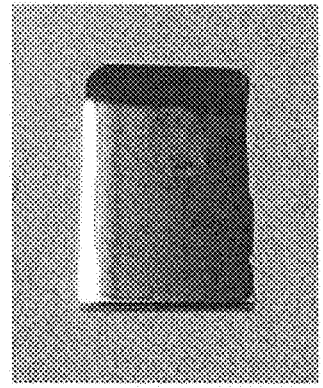
FIG. 17 shows a photograph of a film which was obtained in example 5.
Figure 18:
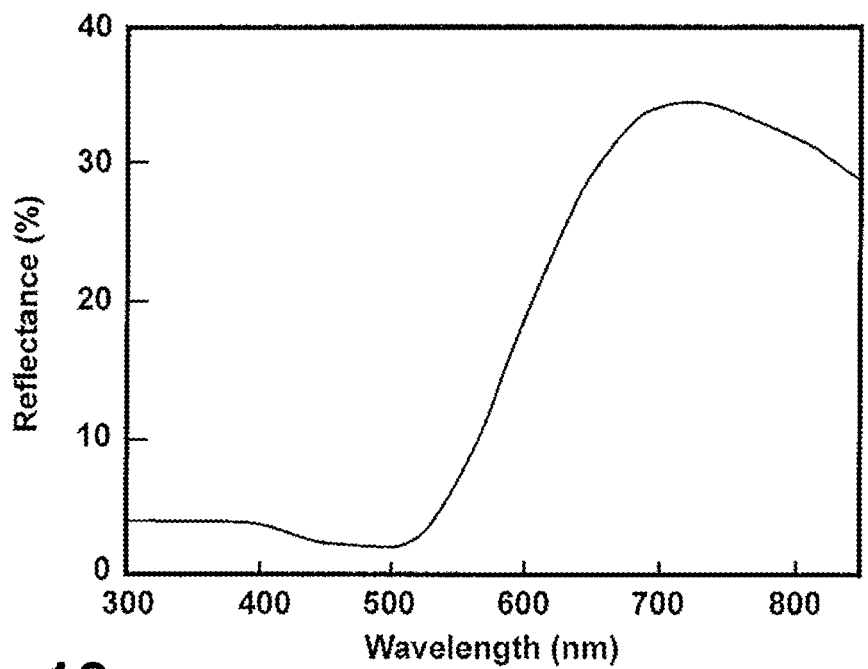
FIG. 18 shows a reflection spectrum of a film which was obtained in example 5.
Figure 19:
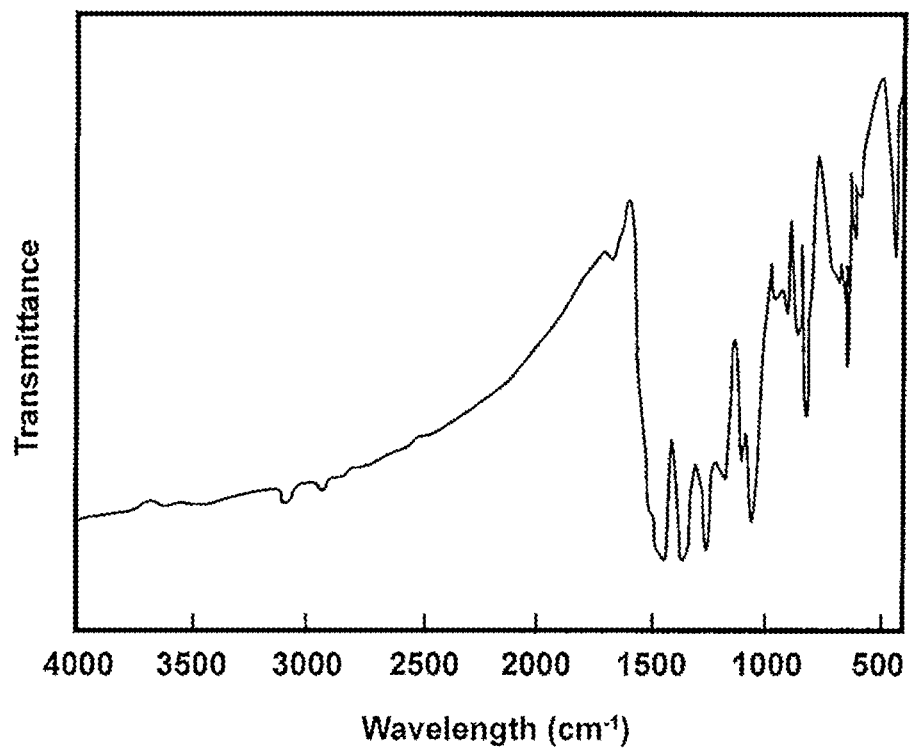
FIG. 19 shows a FT-IR spectrum of a film which was obtained in example 5.

Incidentally, the photograph of the polymer film of this example is shown in FIG. 17, the reflection spectrum is shown in FIG. 18, and the FT-IR spectrum of the powder is shown in FIG. 19, respectively.

Example 6

In this example, the condition was the same as that of example 1, except that iron (III) perchlorate n-hydrate was changed to copper (III) 6-hydrate.

As a result, it was confirmed that a film having a copper metallic luster was formed.

Figure 20:
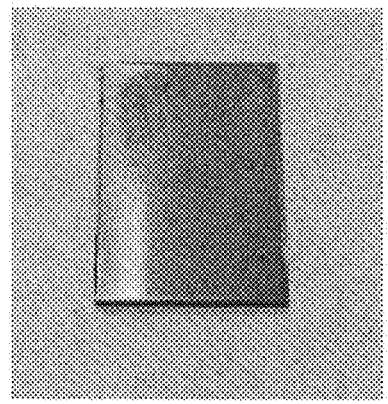
FIG. 20 shows a photograph of a film which was obtained in example 6.
Figure 21:
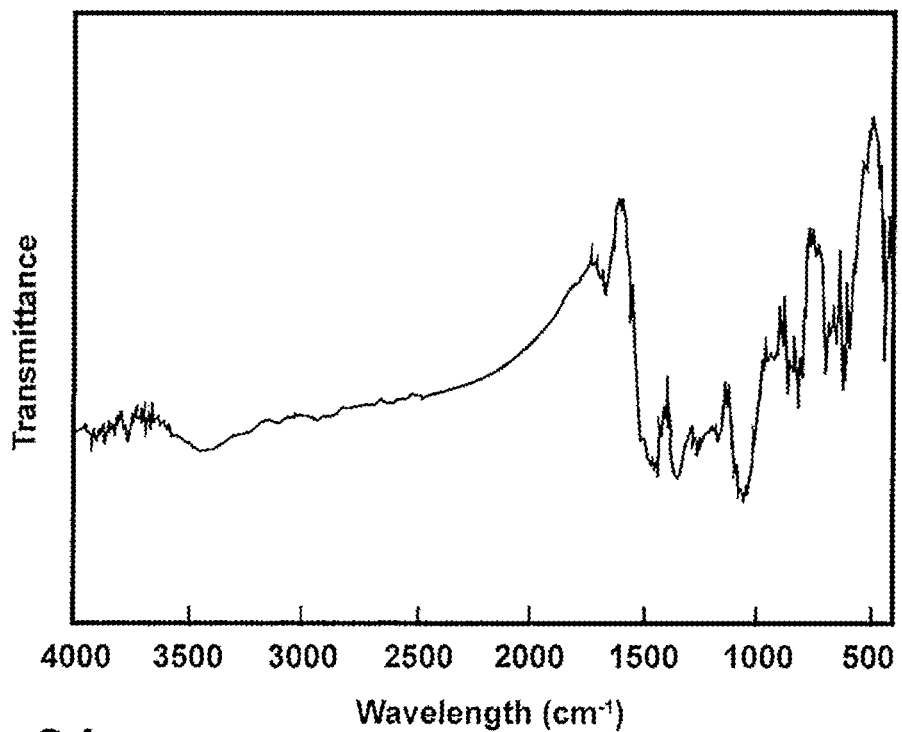
FIG. 21 shows a FT-IR spectrum of a film which was obtained in example 6.
Figure 22:
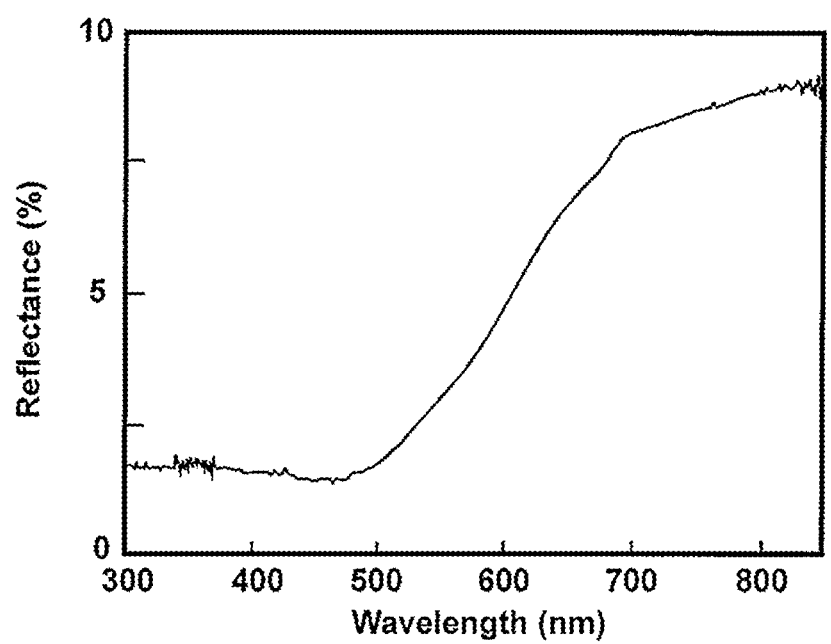
FIG. 22 shows a reflection spectrum of a film which was obtained in example 6.

Incidentally, a photograph of the polymer film is shown in FIG. 20, a FT-IR spectrum is shown in FIG. 21, and a reflection spectrum is shown in FIG. 22, respectively.

Example 7

In this example, the condition was the same as that of example 1, except that iron (III) perchlorate n-hydrate was changed to copper (II) tetrafluoroborate 6 hydrate.

As a result, it was confirmed that a film which had a golden metallic luster was formed.

Figure 23:
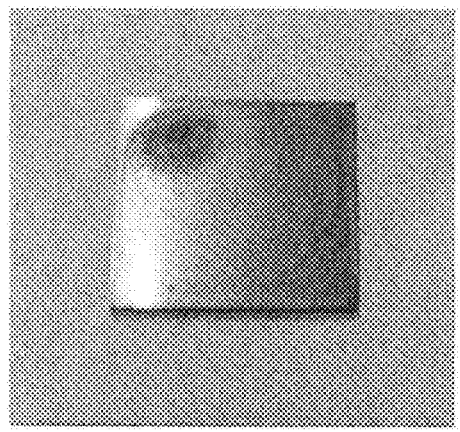
FIG. 23 shows a photograph of a film which was obtained in example 7.
Figure 24:
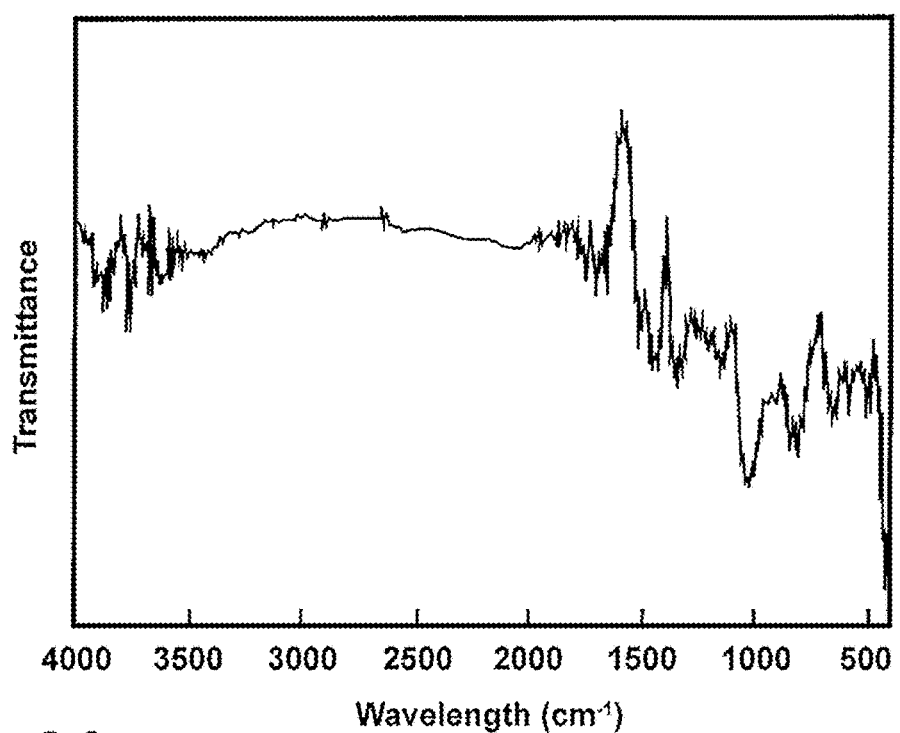
FIG. 24 shows a FT-IR spectrum of a film which was obtained in example 7.
Figure 25:
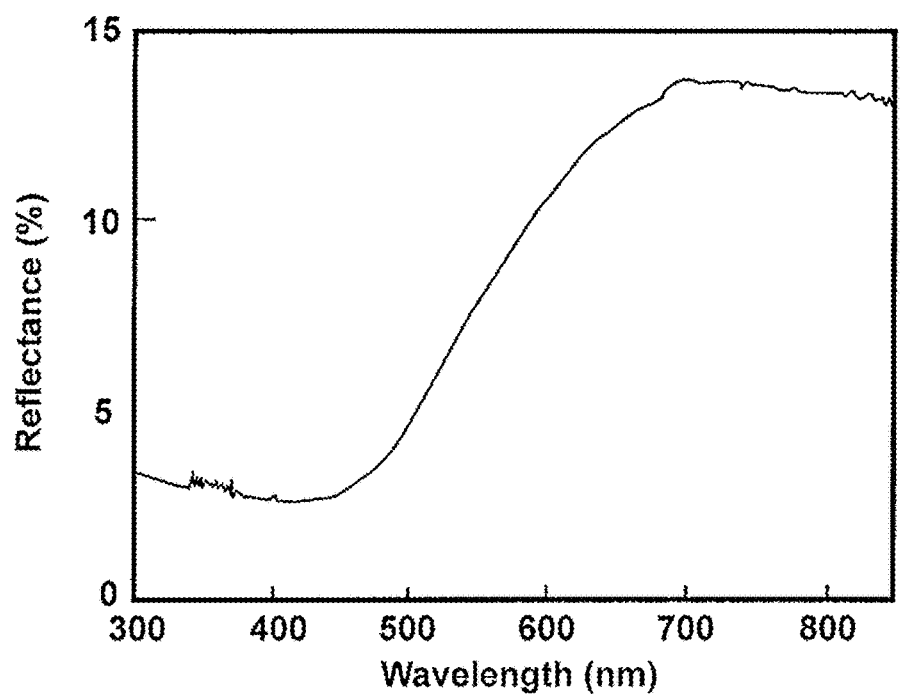
FIG. 25 shows a reflection spectrum of a film which was obtained in example 7.

The photograph of the polymer film is shown in FIG. 23, a FT-IR spectrum of the powder is shown in FIG. 24, and reflection spectrum is shown in FIG. 25, respectively.

Example 8

In this example, the condition was the same as that of example 1, except that the obtained 3-methoxy thiophene polymer powder 11 mg was dissolved in 1 milliliter of γ-buthyrolactone, and the solution was used for coating.

Figure 26:
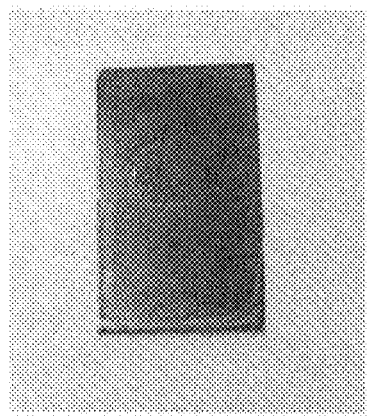
FIG. 26 shows a photograph of a film which was obtained in example 8.

As a result, it was confirmed that a film which had a yellow-greenish ocher metallic luster was formed. Incidentally, the photograph of the polymer film is shown in FIG. 26.

Example 9

In this example, the condition was the same as that of example 1, except that the leaving time for polymerization was 5 minutes, 10 mg of the obtained 3-methoxy thiophene polymer powder was dissolved in 1 milliliter of acetonitrile, and the solution was used for coating.

Figure 27:
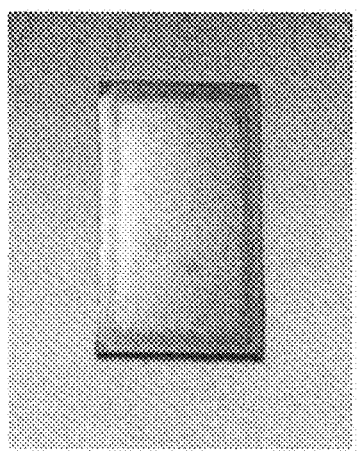
FIG. 27 shows a photograph of a film which was obtained in example 9.

As a result, it was confirmed that a film which had yellowish green metallic luster was formed. Incidentally, the photograph of the polymer film was shown in FIG. 27.

Example 10

In this example, the condition was the same as that of example 1, except that 11 mg of the obtained 3-methoxy thiophene polymer powder was dissolved in 1 milliliter of dimethyl sulfoxide, the solution was used for coating, and the film was desiccated at 90 degrees.

Figure 28:
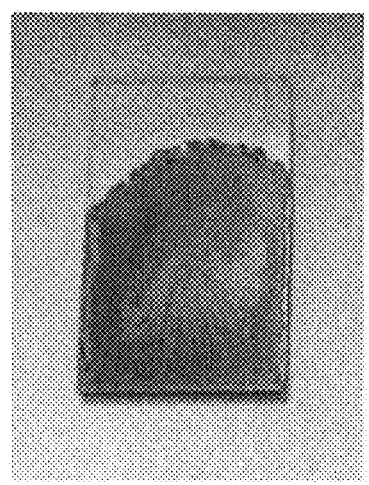
FIG. 28 shows a photograph of a film which was obtained in example 10.

As a result, it was confirmed that a film which had a copper metallic luster was formed. Incidentally, the photograph of the polymer film is shown in FIG. 28.

From the above, by the above-mentioned embodiment and the above-mentioned examples, it is possible to provide a film having a metallic luster, an article which has the film, and a method for producing the film having a metallic luster. Further, producing the film and the article is easier, and the film and the article will hardly deteriorate with time.

INDUSTRIAL APPLICABILITY

The present invention is industrially applicable as a film which has a metallic luster, and an article which is covered with the film. The present invention can be used as a substitute for a metal film. The present invention can be widely used in many fields such as a painted body of a car and a light-shielding metal film, which are the same as those of the metal film.

What is claimed is:

1. A film having a metallic luster, said film comprising a thiophene polymer having a distribution peak of weight-average molecular weight of from 200-30000, is doped with at least one of a perchlorate ion,
    chloride ion and para toluene sulfonic acid ion and is polymerized by chemical polymerization from at least one of alkoxy thiophene and alkyl thiophene, whose number of carbon is 1 or 2,
        wherein said thiophene polymer has a layer-like orientational regular structure which is formed by said chemical polymerization and
        three peaks are derived from said layer-like orientational regular structure of said thiophene polymer in the range from 5 to 30 degrees by X-ray diffraction measurement.

2. A film having a metallic luster, said film comprising a thiophene polymer having a distribution peak of weight-average molecular weight of from 200-30000, is doped with at least one of a perchlorate ion and chloride ion and is polymerized by chemical polymerization from at least one of alkoxy thiophene and alkyl thiophene, whose number of carbon is 1 or 2,
    wherein said thiophene polymer has a layer-like orientation regular structure which is formed by said chemical polymerization and
    three peaks are derived from said layer-like orientational regular structure of said thiophene polymer in the range from 5 to 30 degrees by X-ray diffraction measurement.

3. The film having a metallic luster according to claim 1, wherein said thiophene comprises 3-methoxythiophene.

* * * * *